Aug. 25, 1964   F. M. POOLE ETAL   3,145,564
SYSTEM FOR MEASURING CHARACTERISTICS OF FLUIDS
Filed Feb. 12, 1962   4 Sheets-Sheet 1

Footer M. Poole,
Harold T. Westerheim,
Inventors.
Koenig, Pope,
Seninger and Powers,
Attorneys.

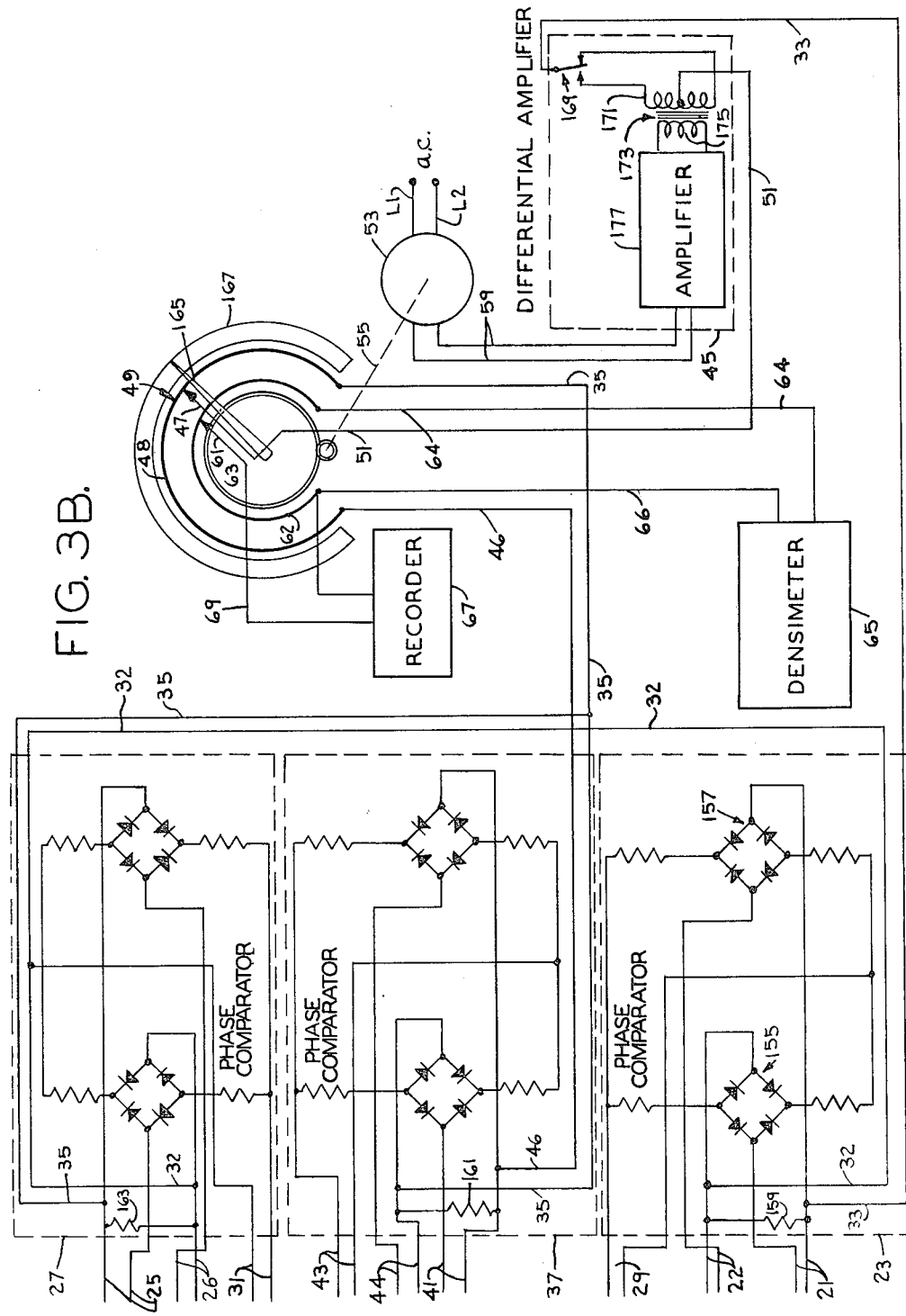

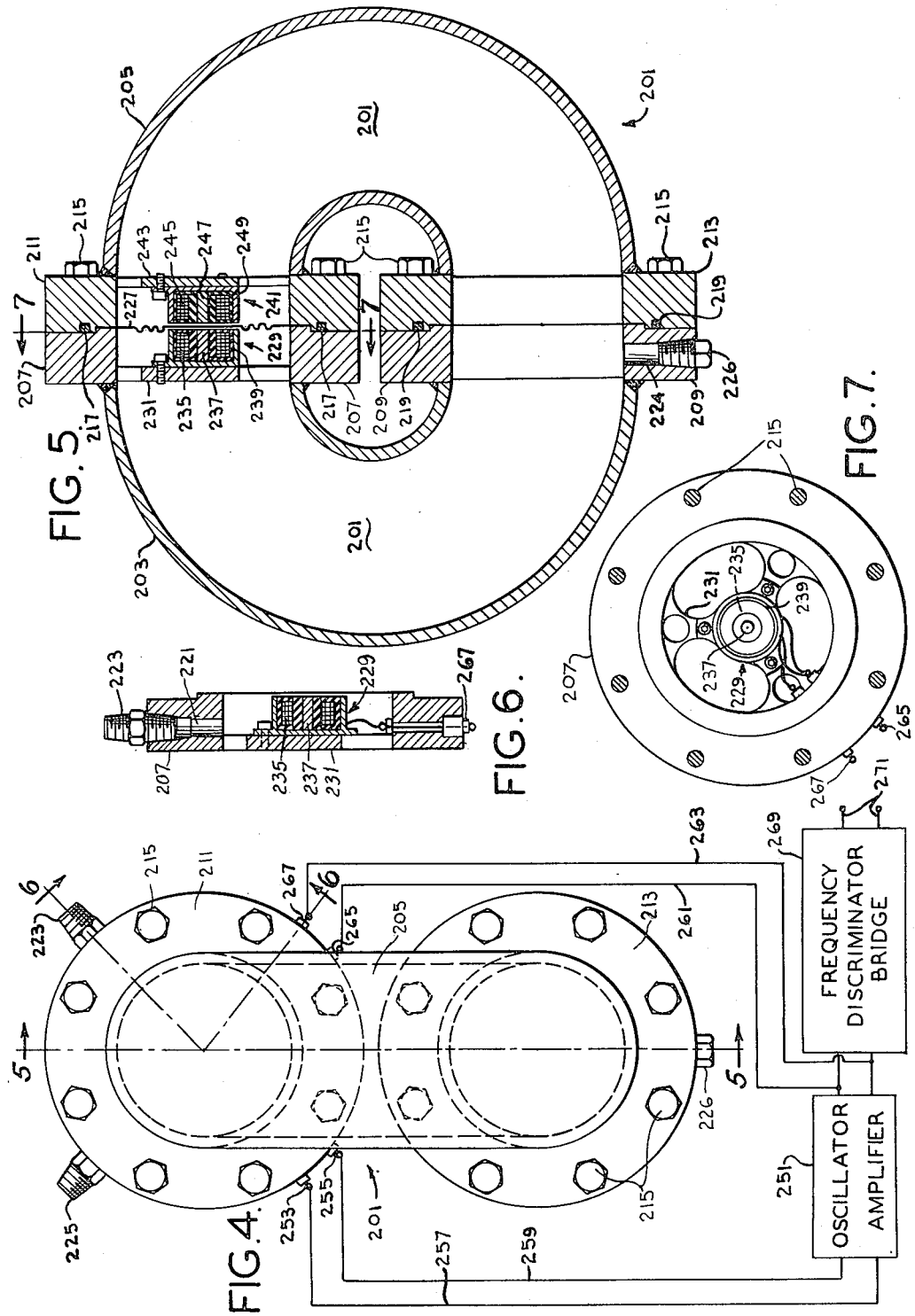

United States Patent Office 3,145,564
Patented Aug. 25, 1964

3,145,564
SYSTEM FOR MEASURING CHARACTERISTICS
OF FLUIDS
Foster M. Poole, University Park, and Harold T. Westerheim, Garland, Tex., assignors, by direct and mesne assignments, of one-half to Foster M. Poole, University Park, Tex., and one-half to Carl Casey, Dallas, Tex.
Filed Feb. 12, 1962, Ser. No. 172,571
11 Claims. (Cl. 73—194)

This invention relates to a system for measuring characteristics of fluids, and more particularly to a method and apparatus for determining the velocity, density and mass flow of fluids, both liquid and gaseous.

Among the several objects of the invention may be noted the provision of a system for determining the velocity of a fluid; the provision of such a system in which the velocity determination is independent of density, temperature, and pressure variations in the fluid; the provision of a system for determining the velocity of propagation of acoustic signals in a fluid; the provision of a gas density sensor for determining the density of a gaseous fluid; the provision of a gas density sensor which is insensitive to environmental or externally applied mechanical vibration, shock and the like, and also insensitive to changes in ambient temperature; the provision of such a gas density sensor which is compact, inexpensive, reliable and accurate in operation; the provision of a flow meter for measuring both the rate of mass flow and the total mass flow of a fluid flowing through a conduit; the provision of a flow meter of the class described in which continuous indications of both the velocity and rate of mass flow are furnished; the provision of a flow meter in which the above determinations are achieved and indications furnished without producing turbulence or agitation in the fluid; and the provision of apparatus as above described in which the above measurements are made under actual flow conditions and which operates with a high degree of accuracy and reliability. Other objects and features will be in part apparent and in part pointed out hereinafter.

The invention accordingly comprises the constructions and methods hereinafter described, the scope of the invention being indicated in the following claims.

In the accompanying drawings in which one of various possible embodiments of the invention is illustrated, FIG. 1 is a block diagram of the various electronic units of the present invention illustrating their interconnection;

FIGS. 3A and 3B are circuit diagrams, partly schematic and partly in block diagram of the apparatus of FIG. 1;

FIG. 4 is an end view of a gas density sensor which may be employed as the densimeter of FIG. 1;

FIG. 5 is a cross section of this sensor taken on line 5—5 of FIG. 4;

FIG. 6 is a cross section taken on line 6—6 of FIG. 4; and

FIG. 7 is a cross section taken along line 7—7 of FIG. 5.

Corresponding reference characters indicate corresponding parts throughout the several views of the drawings.

Figure 2:
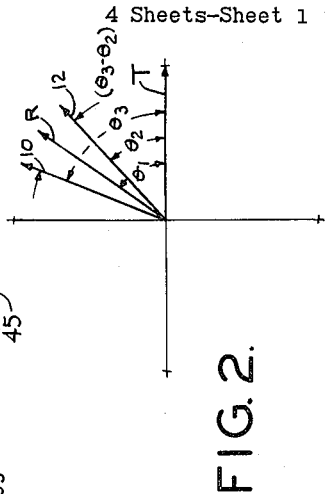
FIG. 2 is a phasor diagram which aids in the understanding of the system of FIG. 1.

In accordance with the invention, an acoustic signal, i.e. a compressional wave of either sonic or ultrasonic frequency, is introduced or transmitted at a first point into a fluid whose velocity is to be measured. This signal passes through the fluid and is received at a second point positioned upstream or downstream of the first point. Because a finite time is required for the acoustic signal to traverse the distance between the first point and the second point, there is a phase difference between the transmitted signal and the received signal. The magnitude of this phase difference is proportional to the frequency of the acoustic signal and the time required for this signal to propagate from the first point to the second point. The propagation time is, in turn, dependent upon: (1) the distance between the first and second points, (2) the velocity of propagation of the acoustic signal in the fluid or, stated more briefly, the sonic velocity in the fluid, and (3) the velocity of the fluid itself as it flows between the first and second points. The second factor, the sonic velocity in the fluid, is a constant for a fluid of a particular density at a given temperature and pressure, but varies with fluctuations in the density, temperature, and pressure of the fluid. This sonic velocity in the fluid also has a bearing on the magnitude of the phase difference between the transmitted and received signals attributable to the third factor, the velocity of the fluid itself.

In any specific embodiment, the distance between the transmitting point and the receiving point is fixed and the frequency of the acoustic signal can be chosen and held substantially constant. Accordingly, the magnitude of the phase shift between the transmitted and received signals can be made to depend solely upon two factors, the sonic velocity in the fluid and the velocity of this fluid. The present invention, by measuring this phase shift and by compensating for the sonic velocity in the fluid value provides a determination of the velocity of the fluid itself as it flows between the transmitting and receiving points. The invention accordingly comprises a transmitting means for introducing an acoustic signal into the fluid and a receiving means spaced from this transmitting means for receiving the acoustic signal after passage through the fluid. A means responsive to both the transmitting means and the receiving means is provided to measure the phase angle between the transmitted signal and the received signal. A fluid velocity determining means is also provided which is responsive to the phase angle measuring means and a velocity of acoustic propagation measuring means and which provides a representation of the true or actual velocity of the fluid flowing between the transmitting means and the receiving means.

With the fluid flowing through a conduit of known cross section, the fluid velocity representation may be employed to obtain a measurement both of rate of mass flow and total mass flow of the fluid. To this end, a densimeter or density sensing device may be provided in the system of this invention to measure the density of the fluid flowing through the conduit. This density measurement is combined with the fluid velocity representation in such a way that a signal proportional to the product of these two quantities results, this product being proportional to the rate of mass flow of the fluid. A determination of the total mass flow of the fluid over a given time interval may be obtained according to the invention by the integration of this resulting product signal.

The densimeter mentioned above may be any conventional density sensing device which provides a measurement of the density of a fluid either liquid or gaseous. If the fluid whose density is to be measured is a gas, however, it is preferred that this densimeter be the novel and improved gas density sensor disclosed herein and forming a part of the present invention. This sensor includes a diaphragm, preferably a deformable one, movable in a gas-containing chamber. The gas whose density is to be measured is fed to the chamber and contained therein, and means are provided for vibrating this diaphragm, this diaphragm having a natural vibratory resonant frequency which is a function of the density of the contained gas. A means is also provided to measure this frequency and to produce an output signal proportional thereto and thus to the density of the gas within the chamber.

Figure 1:
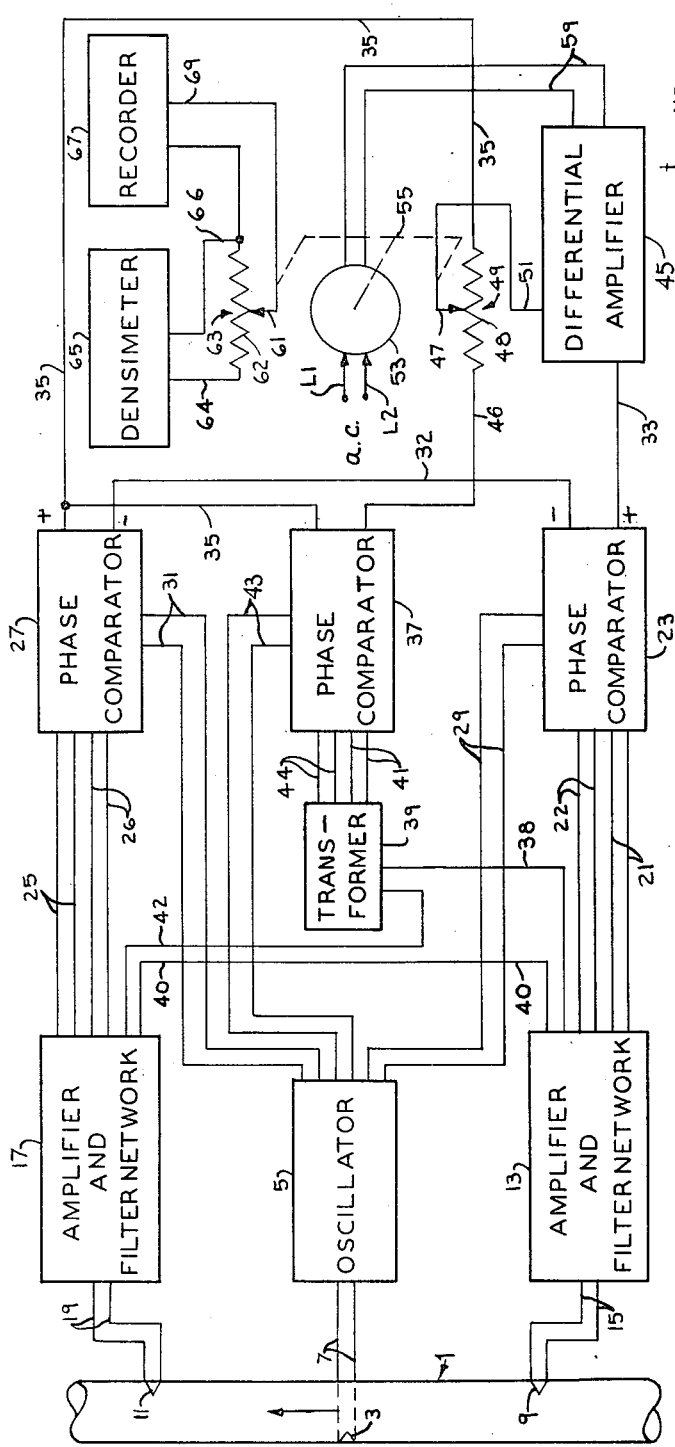
Figure 3A:
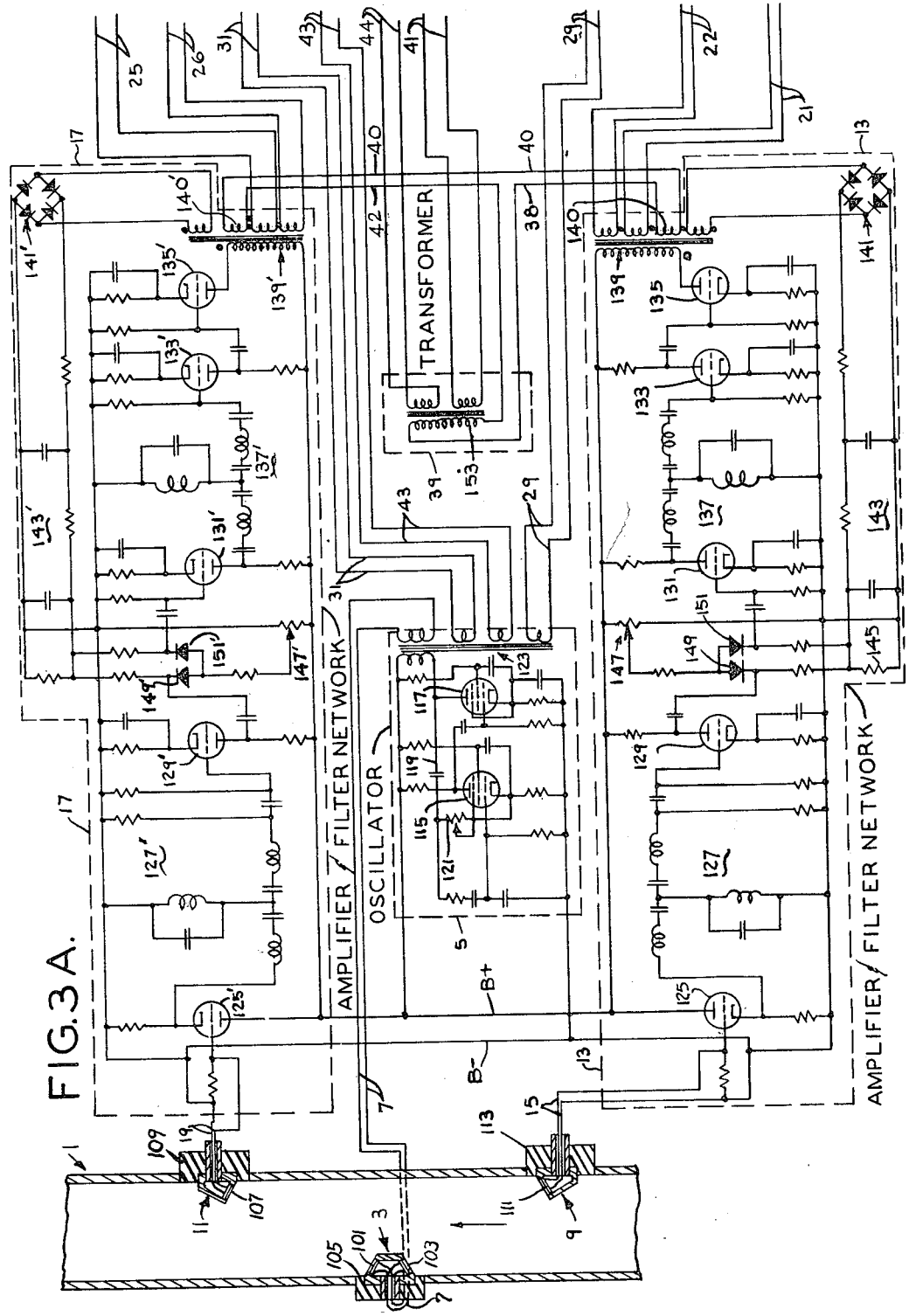

Referring now to the drawings, and more particularly to FIG. 1, reference character 1 designates a conduit or pipe through which flows a fluid whose velocity, density and mass flow are to be measured. Disposed within conduit 1 is a transmitting transducer 3 connected to and energized by a regulated oscillator 5 by a pair of conductors 7. Also disposed within conduit 1 are two receiving transducers 9 and 11, symmetrically spaced upstream and downstream of transducer 3. Receiving transducers 9 and 11 are each mounted so that their respective axes of greatest sensitivity include transmitting transducer 3. Transducers 3, 9 and 11 may, if desired, be positioned within offsets or recesses formed in the walls of conduit 1 so as to be out of the path of the stream of fluid flowing in conduit 1. Transmitting transducer 3 includes two electroacoustic devices connected in parallel, each directed or focused toward one of the receiving transducers. Alternatively, to eliminate the effects of slight differences which may occur in two crystals, only one crystal with both faces exposed but separated by a vertical baffle may be employed in transducer 3. Each of the transducers may be any electroacoustic device which operates satisfactorily at sonic or ultrasonic frequencies, for example, a piezoelectric crystal such as a lead zirconate-titanate crystal. Receiving transducer 9 is connected to a regulated amplifier and filter network 13 by a pair of conductors 15. Receiving transducer 11 is similarly connected to a regulated amplifier and filter network 17 by conductors 19. Amplifiers 13 and 17 are preferably identical units. Two pairs of conductors 21 and 22 connect output terminals of amplifier 13 to a phase comparator 23. In like manner, conductor pairs 25 and 26 connect output terminals of amplifier 17 to a phase comparator 27. A reference signal from oscillator 5 is fed to phase comparator 23 by lines 29 and to phase comparator 27 by lines 31. Phase comparators 23 and 27 are preferably identical (each may be a Sanders type 2 phase comparator) and each functions to provide a D.C. output voltage proportional in magnitude to the phase difference between two A.C. signals applied at their respective input terminal. Thus the D.C. output of phase comparator 23 is proportional in magnitude to the phase angle between an A.C. signal appearing on lines 21 and 22 and the reference A.C. signal appearing on lines 29. Similarly, the D.C. output of phase comparator 27 is proportional in magnitude to the phase angle between an A.C. signal on lines 25 and 26 and the reference A.C. signal on lines 31. As shown in FIGS. 3A and 3B each of the phase comparators 23 and 27 employs two bridge circuits, and for this reason, two pairs of conductors from each of the networks 13 and 17 to respective phase comparators 23 and 27 are required. It is to be understood, however, that any phase sensitive device which functions to produce a D.C. output proportional to the difference in phase between two A.C. input signals may be employed as phase comparators 23 and 27, in which case lines 22 and 26 may be unnecessary.

The respective outputs of networks 13 and 17 are connected in series across the input of transformer 39 by conductors 38, 40 and 42. Transformer 39 functions to vectorially combine the signal appearing on lines 38, 40 with the signal appearing on lines 40, 42 and provide an A.C. signal proportional to the resultant. This resultant signal is applied by two pairs of conductors 41 and 44 to phase comparator 37. This phase comparator 37, which is preferably identical to phase comparators 23 and 27, receives a reference A.C. signal from oscillator 5 by means of a pair of conductors 43. The D.C. output voltage of phase comparator 37 constitutes a D.C. signal which has a magnitude proportional to the phase angle between the resultant of the vector summation of the respective A.C. signals produced by networks 13 and 17 and the reference A.C. signal output of oscillator 5.

In explaining the operation of the system of FIG. 1 thus far described, and in pointing out the significance of the D.C. signals appearing at the outputs of the respective phase comparators 23, 27 and 37, reference is made to FIG. 2 which illustrates the phase relationships of the various signals produced by the system components of FIG. 1. Oscillator 5 generates an A.C. signal of either sonic (15 c.p.s.–20 kc.p.s.) or ultrasonic (above 20 kc.p.s.) frequency and energizes transmitting transducer 3 with the generated signal. This A.C. signal is taken as a reference and is shown as T in FIG. 2. Transducer 3 converts this electrical signal to an acoustic signal and introduces the acoustic signal into conduit 1. This acoustic signal passes through the fluid and is received and converted into electrical signals by receiving transducers 9 and 11. If the fluid in conduit 1 is at rest and if transducers 9 and 11 are symmetrically positioned with respect to transmitting transducer 3, the electrical signals applied to the respective networks 13 and 17 have identical phase angles, $\theta_1$, with respect to T. Both are shown as R in FIG. 2. Since the distance between the transmitting transducer and either of the receiving transducers 9 or 11 is fixed, and since the frequency of regulated oscillator 5 is substantially constant, the phase angle $\theta_1$ between the phasor R and the reference T is proportional to the propagating velocity of the acoustic signal in the fluid contained within conduit 1. This propagating velocity of the acoustic signal in the fluid may be hereinafter referred to simply as sonic velocity in the fluid.

If the fluid in conduit 1 is not at rest, but is flowing in the direction of the arrow shown within conduit 1, it takes less time for the acoustic signal to travel from transducer 3 to transducer 11 than it does for the acoustic signal to travel from transducer 3 to transducer 9. Accordingly, the electrical signal applied to network 17 (this signal being in phase with the acoustic signal received by transducer 11) has a phase angle $\theta_2$, with respect to the reference T, and is shown at 12 in FIG. 2. The electrical signal applied to network 13 (this signal being in phase with the acoustic signal received by transducer 9) has a phase angle $\theta_3$ and is shown as 10 in FIG. 2. Angle $\theta_2$ is less than angle $\theta_1$, whereas angle $\theta_3$ is greater than $\theta_1$. As the velocity of the fluid in conduit 1 decreases, angles $\theta_2$ and $\theta_3$ each approach angle $\theta_1$ in magnitude and the angle ($\theta_3-\theta_2$) decreases. Conversely, as the velocity of the fluid in conduit 1 increases, the angle ($\theta_3-\theta_2$) increases. The magnitude of this angle ($\theta_3-\theta_2$), then, is affected by the velocity of the fluid flowing in conduit 1. This angle ($\theta_3-\theta_2$) is also affected, however, by the sonic velocity in the fluid, which is, in turn, dependent upon the type of fluid flowing, its density, temperature and pressure.

Since the magnitude of angle $\theta_1$ is proportional to the sonic velocity in the fluid flowing in conduit 1, a voltage proportional to this angle $\theta_1$ is produced to compensate for variations in the sonic velocity in the fluid brought about by variations in the temperature, pressure, and density of the fluid. This voltage is provided by vectorially summing phasors 10 and 12 in transformer 39 and comparing the phase angle of the resultant with the reference signal T in phase comparator 37. Because the angle $(\theta_1-\theta_2)$ is always equal in magnitude to the angle $(\theta_3-\theta_1)$, this resultant has a phase angle $\theta_1$, irrespective of the velocity of the fluid flowing in conduit 1. The output of phase comparator 37 is thus a D.C. voltage having a magnitude proportional to the angle $\theta_1$, which is in turn proportional to the sonic velocity in the fluid.

The signal applied to amplifier and filter network 17 (having a phase angle $\theta_2$) is amplified therein and applied to one input of phase comparator 27. Similarly, the signal applied to amplifier and filter network 13 (having a phase angle $\theta_3$) is amplified therein and applied to phase comparator 23. Thus, the output of phase comparator 27 is a D.C. analog of angle $\theta_2$ and the output of phase comparator 23 is a D.C. analog of the angle $\theta_3$. To provide a D.C. analog of the angle $(\theta_3-\theta_2)$, the outputs of phase comparators 23 and 27 are combined in series opposition by conductor 32 producing a difference signal. The result is that the D.C. voltage appearing on conductor 33, with respect to conductor 35, is proportional to, or is an analog of, the angle $(\theta_3-\theta_2)$.

Conductor 33 constitutes one input terminal of a differential amplifier 45. This differential amplifier 45 includes a chopper (see FIG. 3B) for converting the D.C. voltage appearing on line 33 to pulsating D.C. voltage having an amplitude equal to the magnitude of the D.C. voltage. This chopper is vibrated by a source of sixty-cycle A.C. line voltage (not shown). A second input terminal of differential amplifier 45 is connected by conductor 51 to the movable contact or rotor 47 of a potentiometer 49. The fixed resistance 48 of this potentiometer is connected across the output terminals of phase comparator 37 by conductors 35 and 46 which applies a D.C. potential thereto. The output of differential amplifier 45 is connected to a two-phase motor 53 by a pair of conductors 59, the signal supplied by this amplifier energizing one of the two phase windings of this motor. The other phase of motor 53 is connected to a sixty-cycle A.C. reference voltage source by lines L1 and L2. The output of amplifier 45 is an A.C. signal having a frequency of sixty-cycles per second and an amplitude proportional to the difference between the relative magnitudes of the D.C. voltage appearing on line 33 and the D.C. voltage appearing on line 51. The phase (i.e., 0° or 180°) of this A.C. signal, relative to the phase of the A.C. reference voltage supplied by lines L1 and L2, is dependent upon which of these two D.C. voltages, the voltage of line 33 or the voltage of line 51, is greater.

Motor 53 drives rotor 47 through a mechanical linkage 55 as long as differential amplifier 45 supplies an output signal on lines 59. Thus, rotor 47 is driven until the D.C. voltage appearing thereon is equal to the voltage appearing on line 33. Differential amplifier 45, conductors 59, motor 53, movable contact 47, and feedback circuit 51 thus form a balancing means or servo loop which functions to position movable contact 47 so that the voltage appearing at contact 47 with respect to line 35 is maintained continuously equal to the voltage of line 33 with respect to line 35.

To insure that the position of contact 47 is representative of the actual or true velocity of the fluid flowing in conduit 1, a compensation or correction for variations in the sonic velocity in this fluid is effected by applying the D.C. output signal of phase comparator 37 across the fixed resistance 48 of potentiometer 49. With this arrangement, if voltage appearing on line 33 with respect to line 35 is varied solely because of a change in the velocity of the flowing fluid, movable contact 47 is driven by motor 53 until its position represents or indicates this change. In this case, the D.C. output voltage of phase comparator 37 remains constant. If, however, the voltage on line 33 with respect to line 35 is varied, not because of a change in the actual fluid velocity, but rather because of a change in the sonic velocity in the fluid (brought about, for example, by a change in the temperature or pressure of the fluid), the voltage supplied by phase comparator 37 across resistance 48 varies, causing the voltage at contact 47 to equal the voltage on line 33. In this case, movable contact 47 is not moved or driven by motor 53, and its position continues to indicate the actual velocity of the fluid flowing in conduit 1. The indication of fluid velocity, as represented by the position of rotor 47, is thus independent of variations of sonic velocity in the fluid, and accordingly, independent of density, temperature and pressure variations in the fluid.

Since the cross-sectional dimensions of conduit 1 are fixed, the indication of fluid velocity may be employed to provide a representation of both rate of mass flow and total mass flow of the fluid flowing in this conduit. To ascertain rate of mass flow it is required that the fluid velocity representation be multiplied by a representation of the density of the fluid. Integration over any predetermined time interval of the rate of mass flow results in a determination of total mass flow during this time interval.

To determine rate of mass flow, the system of FIG. 1 includes a densimeter 65 and a means for multiplying the output of this densimeter by the fluid velocity representation. Densimeter 65 may be any conventional density sensing device for providing a D.C. output voltage proportional in magnitude to the density of the fluid flowing in conduit 1. Suitable densimeters are disclosed, for example, in U.S. Patents 2,635,462; 2,754,676; 2,785,567; and 2,956,431. The manner in which the fluid flowing in conduit 1 is fed to densimeter 65 will depend upon the type of densimeter chosen and the size of conduit 1. If the fluid flowing in conduit 1 is a gas, it is preferred that densimeter 65 be the gas density sensor illustrated in FIGS. 4 through 7 and forming a part of the present invention. This gas density sensor is described in detail below. The means for multiplying the output of desimeter 65 by the fluid velocity measurement is constituted by a potentiometer 63 having a fixed resistance 62 and a contact arm or rotor 61. Rotor 61 is ganged with movable contact 47 so that it too is positioned by motor 53 in accordance with the actual fluid velocity of the fluid within conduit 1. The fixed resistance 62 is connected across the output terminals of densimeter 65 by lines 64 and 66 so that the D.C. voltage appearing at rotor 61 with respect to line 66 is proportional to the product of the fluid density and the fluid velocity. This D.C. voltage is an analog of the rate of mass flow of the fluid flowing through conduit 1. Rotor 61 is connected to a recorder 67 by a conductor 69. This recorder 67 functions as an integrator by relating the D.C. analog of rate of mass flow with a suitable time base to facilitate a totalizing of the rate of mass flow over a given time interval. Preferably, recorder 67 is also provided a continuous indication of the voltage applied to it, and thus a continuous indication of the rate of mass flow of the fluid flowing in conduit 1.

In view of the foregoing it is seen that the apparatus of FIG. 1 may be employed to determine one or a number of various characteristics of a fluid flowing through conduit 1. The position of movable contact 47 is representative of the velocity of this fluid. The D.C. voltage appearing at the output of phase comparator 37 is an analog of the velocity of propagation of acoustic signals in this fluid. The D.C. output of densimeter 65 is proportional to the density of this fluid. The D.C. voltage on line 69 with respect to line 66 is an analog of the rate of mass flow of this fluid. And finally, the integration of the rate of mass flow analog by recorder-integrator 67 results in a representation of the total mass flow of this fluid.

Referring now to FIGS. 3A and 3B which show in greater detail the system of FIG. 1, transmitting transducer 3 is illustrated as being constituted by two piezoelectric crystals 101 and 103 mounted in conduit 1 by insulating supporting head 105. Receiving transducer 11 is constituted by a piezoelectric crystal 107 mounted in conduit 1 by an insulating supporting head 109 and receiving transducer 9 is constituted by a piezoelectric crystal 111 mounted in conduit 1 by an insulating support 113. Crystals 101 and 103, which preferably have identical operating characteristics are connected in parallel and each energized by oscillator 5 by conductors 7. Oscillator 5 is an R-C oscillator which includes two pentodes 115 and 117. A feedback circuit 119, which includes a variable resistance or potentiometer 121, connects the plate of pentode 117 with the cathode of pentode 115. Oscillator 5 generates an A.C. signal having a frequency of, for example, two kilocycles. The signal generated by this oscillator is applied to phase comparators 23, 27 and 37 by pairs of conductors 29, 31 and 43, respectively.

The output signal of receiving transducer 9 is applied by conductors 15 to the grid of a cathode follower 125 included in amplifier and filter network 13. This amplifier 13 further includes a filter network 127, triode stages 129, 131, 133 and 135, and an output transformer 139. Stage 131 is connected to stage 133 by an additional filter network 137. Filter networks 127 and 137 are each tuned to the frequency of the signal generated by oscillator 5. A feedback circuit from output transformer 139 includes a full-wave bridge rectifier 141, smoothing circuit 143 and resistor 145. The level of the output of amplifier 13 is controlled by the setting of a potentiometer 147 which functions in conjunction with the feedback circuit and two diodes 149 and 151 to maintain this level constant. If the output signal of amplifier 13 exceeds the level determined by the setting of potentiometer 147, the feedback circuit functions, by applying a positive D.C. voltage proportional in magnitude to the amplitude of the output A.C. signal to the cathode of diodes 149 and 151, to provide a limiting or regulating action.

Amplifier and filter network 17 is identical to amplifier and filter network 13 and like components thereof are identified by the use of primed reference numerals. Thus, cathode follower 125' corresponds to cathode follower 125, filter network 127' corresponds to filter network 127, and so on.

Amplifier 13 has three output circuits, one consisting of conductors 38 and 40, a second consisting of a pair of conductors 21, and a third consisting of a pair of conductors 22. Conductors 21 and 22 are connected to input terminals of phase comparator 23. Amplifier 17 also has three output circuits, one consisting of conductors 40 and 42, a second consisting of a pair of conductors 25, and a third consisting of a pair of conductors 26. Conductor 38 is connected to one side of the primary winding 153 of transformer 39, while conductor 42 is connected to the other side of this primary winding. A series loop comprising a secondary winding 140' of output transformer 139', line 40, a secondary winding 140 of output transformer 139, line 38, the primary winding 153 of transformer 39, and line 42 is thus formed. This arrangement provides for the addition or vector summation of the two A.C. signals appearing at the respective amplifiers 13 and 17 in transformer 39 producing a resultant A.C. signal. The two secondary windings of transformer 39 are connected to phase comparator 37, shown in FIG. 3B, by two pairs of conductors 41 and 44.

Phase comparator 23 includes two bridge rectifying circuits 155 and 157. The reference A.C. signal from oscillator 5 is applied by conductors 29 to each of the upper and lower terminals of these bridge circuits. The A.C. output signal of amplifier 13 is connected as indicated to the left and right terminals of each of these by conductors 21 and 22. The D.C. output of phase comparator 23 is taken across resistor 159 by conductors 32 and 33. Phase comparators 27 and 37 are identical in construction to phase comparator 23; the output of comparator 37 being taken across resistor 161 by lines 35 and 46 and the output of comparator 27 being taken across resistor 163 by lines 32 and 35. Line 46 is connected to one side of the fixed resistance 48 of potentiometer 49. This potentiometer is a slide-wire type potentiometer having an indicating pointer 165 and a scale 167. The other side of slide-wire 48 is connected to conductor 35. The position of movable contact 47 is controlled by motor 53 through mechanical linkage 55. Pointer 165, movable contact 47 and rotor 61 are ganged together to be positioned as a unit.

Differential amplifier 45 includes a chopper 169, for converting the D.C. signal appearing on line 33 to a pulsating D.C. signal. This chopper is vibrated by a source of sixty-cycle A.C. line voltage (not shown). The two contacts of chopper 169 are connected across the primary winding 171 of an input transformer 173 which converts the pulsating D.C. signal to an A.C. input signal to a low-frequency amplifier 177. Contact 47 is connected to the center-tap of winding 171 by conductor 51. If the D.C. voltage appearing on line 33 with respect to line 35 is equal in magnitude to the D.C. voltage appearing on line 51 with respect to line 35, there will be no pulsating D.C. signal applied to primary winding 171 of transformer 173 and therefore no A.C. input signal to amplifier 177. If, however, these two voltages are not equal in magnitude, there will be an A.C. signal produced by secondary winding 175 and applied to the input of amplifier 177 which functions as a means for detecting and utilizing this signal. This A.C. signal has an amplitude proportional to the difference in magnitude between the two D.C. signals and a phase (leading or lagging, with respect to the A.C. source which vibrates chopper 169) dependent on the polarity of the composite or difference of the two D.C. voltages; the voltage on line 33 and the voltage on line 51. The A.C. signal, if there is one, is amplified by amplifier 177 and applied to one phase of two-phase motor 53. The other phase of this motor is connected to the sixty-cycle A.C. reference source (which vibrates chopper 169) by conductors L1 and L2.

The D.C. voltage output of densimeter 65 is connected across a slide wire resistance 62 of potentiometer 63 by lines 64 and 66. Since rotor 61 of potentiometer 63 is ganged with movable contact 47, and hence positioned according to the velocity of the fluid flowing in conduit 1, the voltage appearing on rotor 61 with respect to line 66 is proportional to the product of the density of this fluid and its velocity. This voltage, which is a D.C. analog of the rate of mass flow, is applied by conductor 69 to recorder 67, described above.

If the fluid flowing in conduit 1 is a gas, it is preferred that a gas density sensor such as illustrated in FIGS. 4 through 7 be employed as the densimeter 65. This gas density sensor operates on the principle that a diaphragm mounted in a chamber containing a gas whose density is to be measured has a natural or resonant frequency of vibration which is a function of the physical characteristics of the diaphragm and the density of the gas medium in which it vibrates. In a particular embodiment, the physical characteristics of the diaphragm are constants, and hence, the natural frequency of vibration of the system depends solely upon the density of the gas within the gas-containing chamber.

Referring now to FIGS. 4 through 7, the gas density sensor of this invention is shown as including a generally toroidally shaped chamber, indicated at reference numeral 201, formed by two U-shaped tubes or return bends 203 and 205. A pair of flanges 207 and 209 are attached to the ends of tube 203, as by welding for example. Similarly, a pair of flanges 211 and 213 are attached to the ends of tube 205. The resulting flanged tubes are joined by bolts 215. A seal is effected between flanges 207 and 211 by an O-ring 217, and between flanges 209 and 213, by an O-ring 219. Chamber 201 is provided with an inlet 221 by drilling and tapping a hole in flange 207. An inlet fitting 223 is threaded into inlet 201. An outlet for chamber 201 is drilled and tapped in flange 211, and provided with an outlet fitting 225. A tapped hole 224 in flange 209 is provided to permit the draining, either continuously or intermittently, of any condensate which might form in chamber 201. A plug 226 may be threaded into this hole.

Clamped between flanges 207 and 211 is a deformable diaphragm 227. This diaphragm is circular in configuration and separates the portion of chamber 201 formed by the inner walls of flange 207 from the portion of the chamber 201 formed by the inner walls of flange 211. So that the resonant frequency of diaphragm 227 does not change with temperature changes, diaphragm 227 should be made of a material having a substantially constant modulus of elasticity. A suitable material is a wrought nickel ferrous alloy which contains, other than iron, from 41 to 43% nickel, from 2.2 to 2.6% titanium, from 5.1 to 5.7% chromium, up to .06% carbon, from .3 to .6% manganese, from .3 to .8% silicon, from .4 to .8% aluminum, up to .04% phosphorus, and up to .04% sulphur. Such an alloy is commercially available under the trade designation "Ni-Span C." Diaphragm 227 may be, for example, .003 inch thick.

Diaphragm 227 is driven by an electromagnet, indicated generally by reference numeral 229, mounted on a spider 231 within chamber 201. Spider 231 is integral with flange 207. Electromagnet 229 is constituted by a coil 235 and a permanent magnet pole piece 237, enclosed by a coil shield 239. A pickup transducer, indicated generally by reference numeral 241, is also mounted within chamber 201 on the side of diaphragm 227 opposite electromagnet 229. This transducer is bolted to a spider 243, integral with flange 211, and is constituted by an electromagnet which includes a coil 245 and a permanent magnet 247, both placed within a coil shield 249. Coil 245 of pickup transducer 241 is connected to the input terminals of an oscillator-amplifier 251 by terminals 253 and 255 and conductors 257 and 259. The output terminals of this oscillator-amplifier are connected to coil 235 by driver electromagnet 229 by conductors 261 and 263 and terminals 265 and 267. The outputs of unit 251 are also connected to the input terminals of a frequency measuring device, in this case, a frequency discriminator bridge circuit 269. This bridge circuit has output terminals 271.

Oscillator-amplifier 251 is any conventional regulated electronic amplifier such as illustrated, for example, as unit B in FIGS. 7 and 8 of U.S. Patent No. 2,956,431. Frequency measuring device 269 may be any frequency sensitive device which produces a D.C. output voltage proportional in magnitude to frequency of an A.C. input signal. This unit may be the same as the frequency discriminator bridge circuit shown as unit C in FIGS. 7 and 9 of the aforesaid Patent No. 2,956,431.

The operation of the gas density sensor of FIGS. 4 through 7 is as follows:

A gas whose density is to be measured is introduced into chamber 201 through inlet fitting 223. This gas passes through the portion of chamber 201 formed by U-shaped tube 203, through the portion of this chamber formed by tube 205, and then out through outlet fitting 225. The gas envelopes and contacts both faces of diaphragm 227. Any casual vibration of the system, or any ambient noise transient in amplifier 251, causes diaphragm 227 to vibrate producing an electrical signal at the output of pickup transducer 241. This signal is amplified by amplifier 251 and fed by conductors 261 and 263 to energize driving electromagnet 229. This electromagnet 229 in turn vibrates diaphragm 227. Transducer 241 senses this vibration and feeds an electric signal to amplifier 251 which in turn again energizes driver 229. A closed loop is thus formed which oscillates at a resonant frequency which is a function of the physical characteristics of the diaphragm, the gas medium within chamber 201, and the parameters of regulated oscillator-amplifier 251. As the diaphragm characteristics and the parameters of unit 251 are fixed, the resonant frequency of the thus formed oscillatory loop is dependent solely upon the density of the gas flowing through chamber 201. Frequency sensing means 269 is provided to provide a D.C. output voltage at terminals 271 proportional in magnitude to this resonant frequency. This D.C. voltage is an analog of the density of the gas contained within chamber 201.

The gas density sensor of FIGS. 4 through 7 thus provides a compact unit which facilitates an accurate representation or determination of the density of a gas. By employing U-shaped tubes in this unit having thick walls, isolation from effects of environmental shocks or mechanical vibration is attained. And because diaphragm 227 is made of a material having a constant modulus, the density determination is substantially unaffected by variations in the ambient temperature. The D.C. output voltage appearing at terminals 271 may be applied to an indicator to provide an indication of density of the gas in chamber 201 and/or it may be conducted to a recorder or some other unit. If the sensor of FIG. 4 is to be employed in the system of FIG. 1, terminals 271 would be connected across the fixed resistance 62 of potentiometer 63.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. Apparatus for determining the velocity of a fluid flowing through a conduit comprising:
    transmitting means disposed in said conduit for introducing an acoustic signal into the fluid,
    receiving means disposed in said conduit and spaced along the axis of flow from said transmitting means for receiving the acoustic signal after passage through the fluid,
    phase comparing means responsive to said transmitting means and said receiving means for measuring the phase angle between the transmitted signal and the received signal and producing a first electrical signal having a magnitude proportional to said phase angle,
    means for measuring the velocity of propagation of the acoustic signal in the fluid and producing a second electrical signal proportional thereto, and
    means responsive to both said first and second electrical signals to provide a representation of the actual velocity of the fluid flowing in said conduit between said transmitting means and said receiving means, said last recited means including:
    a potentiometer constituted by a first fixed resistance and a first movable contact,
    means for applying the second electrical signal across the first fixed resistance of said potentiometer,
    a motor for positioning said first movable contact, and
    means for balancing said first electrical signal against the portion of said second electrical signal present across the portion of said first resistance between one end thereof and said first movable contact,
    said motor being responsive to said balancing means to actuate said first movable contact until said first signal and said portion of said second signal are balanced,
    whereby variations in the first signal caused by variations in said propagation velocity are compensated and the position of said movable contact is representative of the actual velocity of the fluid flowing between said transmitting means and said receiving means.

2. Apparatus as set forth in claim 1, further including:
a second potentiometer constituted by a second fixed resistance and a second movable contact, said second movable contact being actuated by said motor for simultaneous movement with said first movable contact thereby positioning said second movable contact a function of the actual velocity of the fluid flowing in said conduit, means for measuring the density of said fluid and producing a third electrical signal proportional thereto, and means for applying said third signal across the second fixed resistance of said second potentiometer, whereby the electrical signal present across the portion of said second resistance between one end thereof and the second movable contact has a magnitude proportional to the rate of mass flow of the fluid flowing in said conduit.

3. Apparatus as set forth in claim 2, further including a recorder for recording the last said electrical signal to relate this signal to a time base, whereby the total mass flow of the fluid flowing in said conduit may be ascertained.

4. Apparatus for determining the velocity of a fluid flowing through a conduit comprising:
an oscillator for generating an A.C. electrical signal,
a transmitting transducer disposed within said conduit for converting said electrical signal to an acoustic signal and for introducing this acoustic signal into the fluid,
two receiving transducers positioned within said conduit, one upstream and one downstream of said transmitting transducer, each receiving transducer receiving said acoustic signal after passage through the fluid and converting said acoustic signal to an electrical signal,
a first phase comparator for providing a first electrical output signal proportional to the phase angle between said A.C. signal generated by said oscillator and said signal produced by one of said receiving transducers,
a second phase comparator for providing a second electrical output signal proportional to the phase angle between said A.C. signal generated by said oscillator and said signal produced by the other of said receiving transducers,
means for combining said first and second electrical output signals to produce a difference signal,
means for vectorially combining the electrical signals produced by said receiving transducers to produce a resultant electrical signal,
a third phase comparator for providing a third electrical output signal proportional to the phase angle between the A.C. signal generated by said oscillator and said resultant electrical signal, and
detection means responsive to said difference signal and said third electrical output signal to provide a representation of the velocity of the fluid flowing in said conduit.

5. Apparatus as set forth in claim 4 wherein said detection means for providing a representation of the fluid velocity includes:
a first potentiometer constituted by a first fixed resistance and a first movable contact,
means for applying said third electrical output signal across the first fixed resistance
means for positioning said first movable contact, and
means for balancing said difference signal against the portion of said third electrical signal present across the portion of said first resistance between one end thereof and said first movable contact,
said positioning means being responsive to said balancing means to actuate said first movable contact until said difference signal and said portion of said third signal are balanced,
whereby variations in said difference signal which are caused by variations in the velocity of propagation of acoustic signals in said fluid are compensated and the position of said movable contact is representative of the actual velocity of the fluid flowing in said conduit.

6. Apparatus as set forth in claim 5, further including:
a second potentiometer having a second fixed resistance and a second movable contact, said second movable contact being actuated by said positioning means for simultaneous movement with said first movable contact thereby positioning said second movable contact as a function of the actual velocity of the fluid flowing in said conduit,
a densimeter for measuring the density of said fluid and producing an electrical signal proportional thereto, and
means for applying said signal proportional to density across the second fixed resistance of said second potentiometer,
whereby the electrical signal present across the portion of said second resistance between one end thereof and the second movable contact has a magnitude proportional to the rate of mass flow of the fluid flowing in said conduit.

7. Apparatus as set forth in claim 6, further including a recorder for recording the last said electrical signal to relate this signal to a time base, whereby the total mass flow of the fluid flowing in said conduit may be ascertained.

8. Apparatus as set forth in claim 6 wherein the fluid flowing in said conduit is a gas and wherein said densimeter includes:
a diaphragm disposed in a gas-containing chamber,
means for feeding the gas flowing in said conduit to said chamber,
means for vibrating said diaphragm, said diaphragm having a natural vibratory resonant frequency which is a function of the density of said gas, and
means for measuring this frequency thereby to provide a representation of the density of the contained gas.

9. Apparatus for measuring the velocity of propagation of an acoustic signal in a fluid flowing through a conduit comprising:
transmitting means for introducing an acoustic signal into the fluid,
two receiving means symmetrically positioned within said conduit upstream and downstream of said transmitting means for receiving said acoustic signal after passage through the fluid,
means responsive to said two receiving means for combining the outputs thereof to produce a resultant signal, and
means for comparing the phase of said resultant signal with the phase of the wave introduced into the conduit by said transmitting means to produce an electrical output signal which is an analog of the velocity of propagation of an acoustic signal in said fluid.

10. Apparatus as set forth in claim 9 wherein said combining means includes a transformer and said electrical output signal of said comparing means is a D.C. signal.

11. Apparatus for measuring the density of a gas comprising:
a chamber for containing the gas whose density is to be measured,
a diaphragm mounted in said chamber in contact with said gas, said chamber being substantially toroidal in shape and having relatively thick walls for insulating said diaphragm from environmental shocks or vibration, an electromagnet for vibrating said diaphragm, a pickup transducer for sensing vibrations in said diaphragm and producing an electrical signal in response thereto, an electronic unit connected to said pickup transducer for energizing said electromagnet and vibrating said diaphragm in response to said electrical signal, whereby a closed oscillatory loop is formed having a frequency of oscillation which is a function of the density of the gas contained in said chamber, and a frequency sensitive device for measuring said frequency and providing a representation of the density of said gas.

References Cited in the file of this patent

UNITED STATES PATENTS

| | | |
|---|---|---|
| 2,082,539 | Fischer | June 1, 1937 |
| 2,283,750 | Mikelson | May 19, 1942 |
| 2,472,609 | Moore | June 7, 1949 |
| 2,480,646 | Grabau | Aug. 30, 1949 |
| 2,568,277 | Eltgroth | Sept. 18, 1951 |
| 2,921,467 | Hedrich et al. | Jan. 19, 1960 |
| 2,991,650 | Katzenstein et al. | July 11, 1961 |